Aug. 25, 1964    R. S. LANGDON    3,145,960
MOTOR MOUNTING ARRANGEMENT
Filed March 8, 1962    4 Sheets-Sheet 1
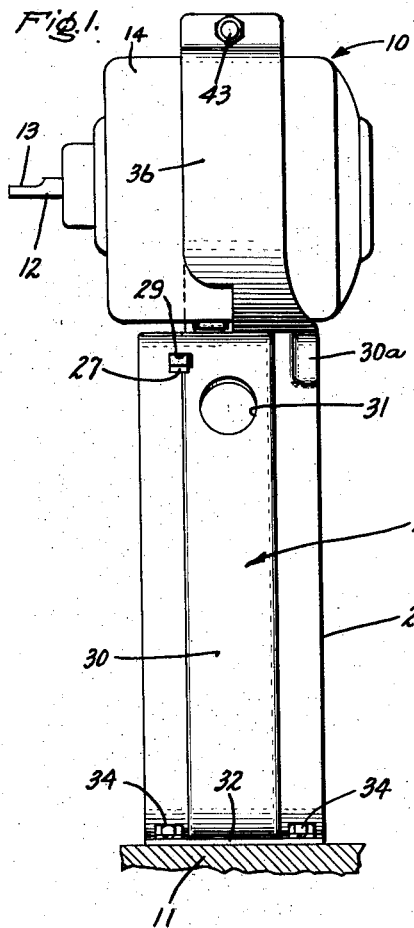
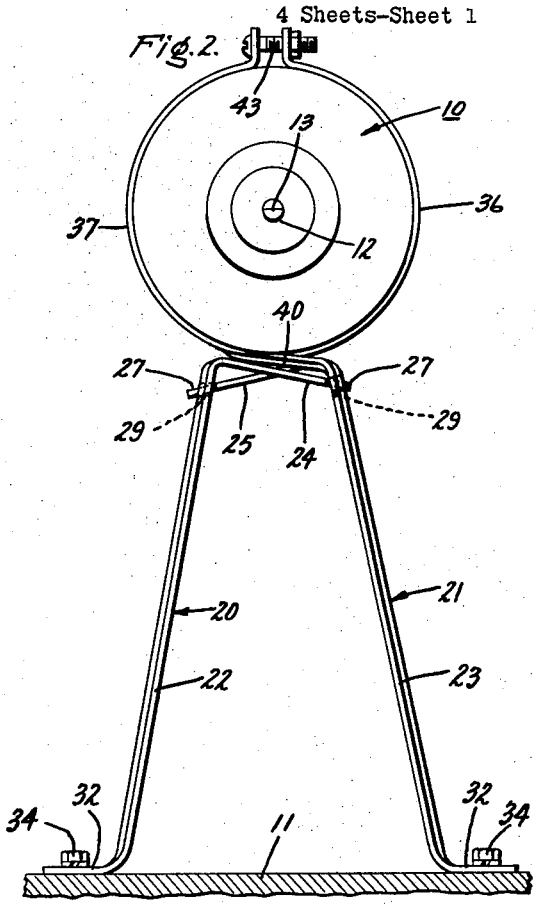
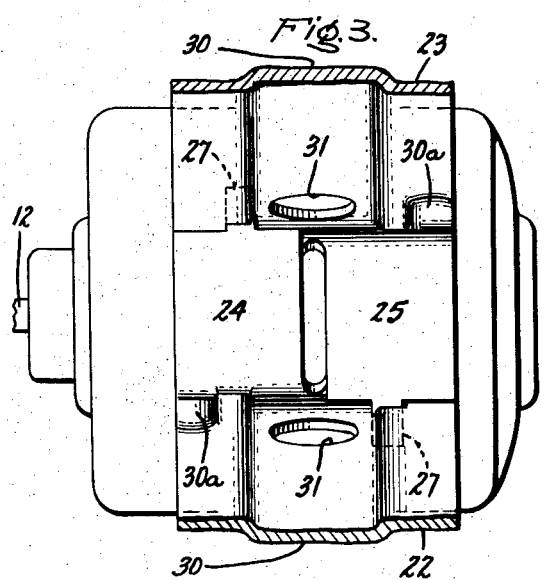
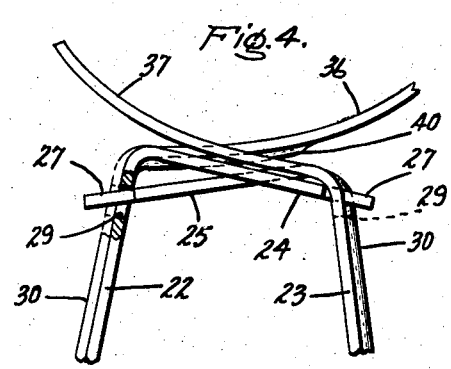
Inventor:
Robert S. Langdon,
by John M. Stoudt,
Attorney.

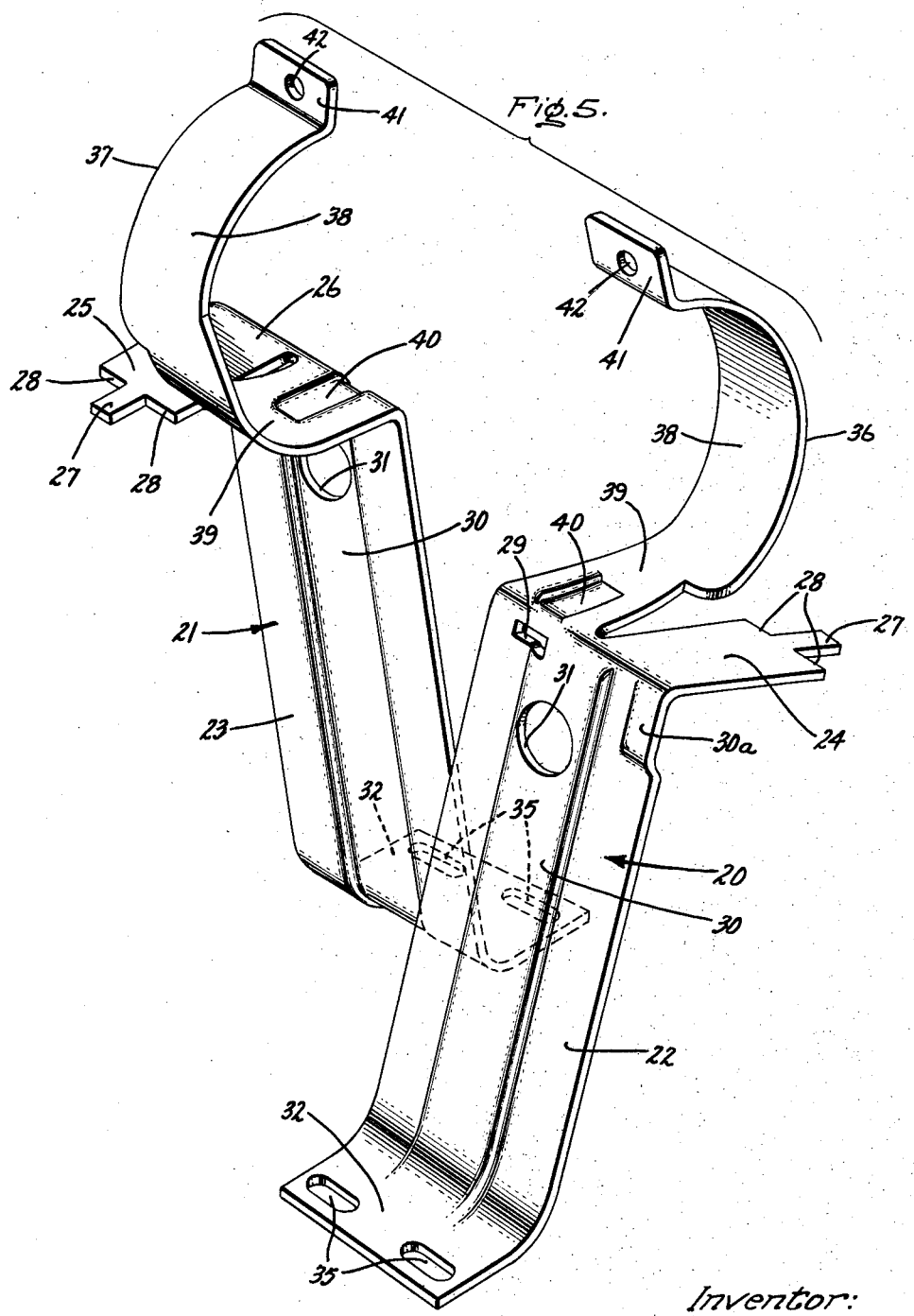

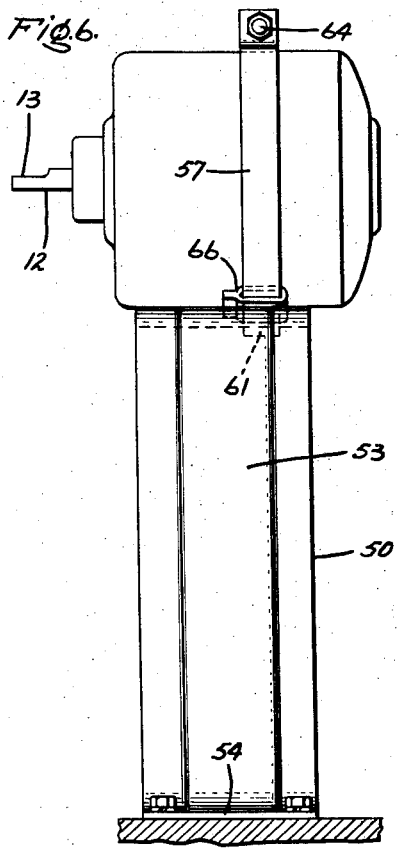
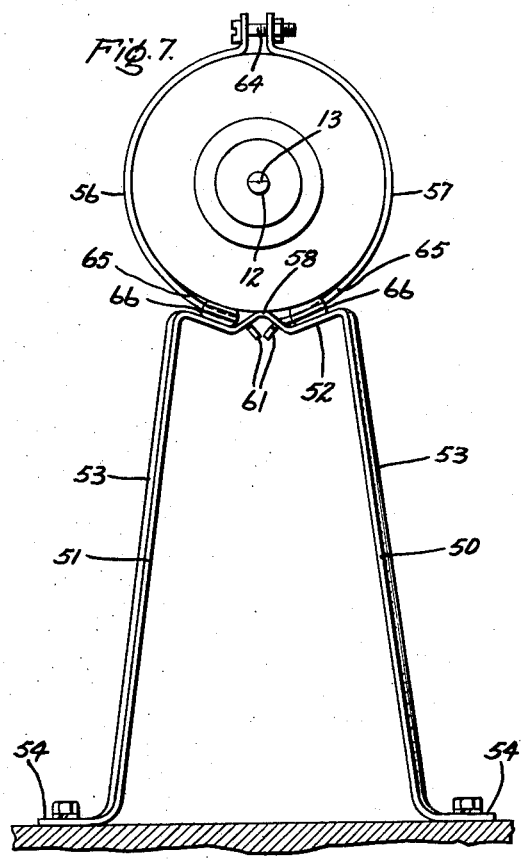
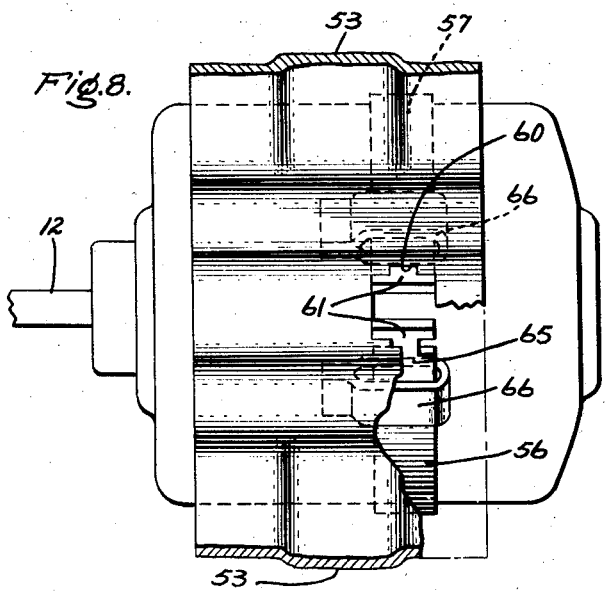

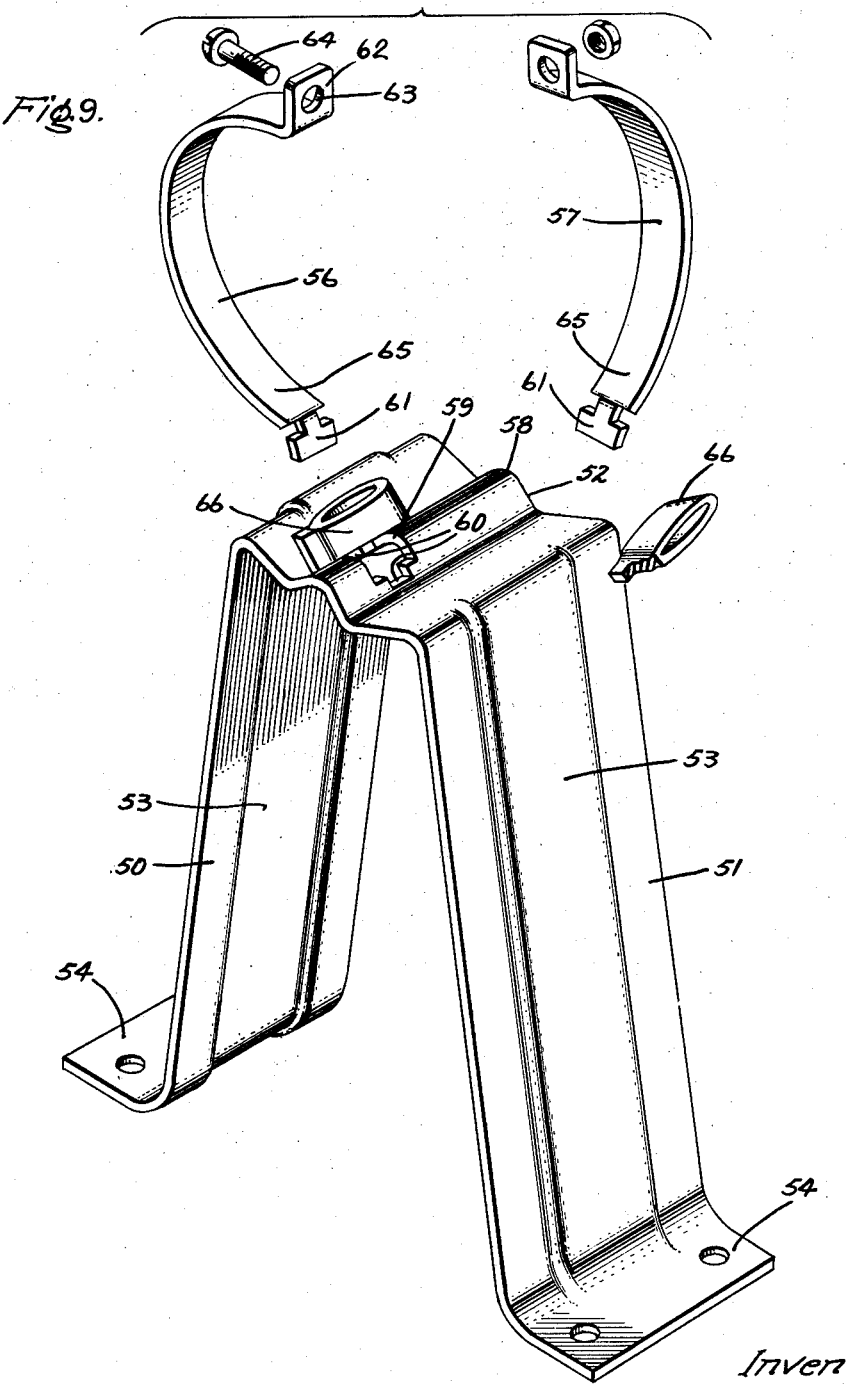

United States Patent Office 3,145,960
Patented Aug. 25, 1964

3,145,960
MOTOR MOUNTING ARRANGEMENT
Robert S. Langdon, Fort Wayne, Ind., assignor to General Electric Company, a corporation of New York
Filed Mar. 8, 1962, Ser. No. 178,389
6 Claims. (Cl. 248—13)

This invention relates to an improved motor mounting arrangement, an more particularly to an improved vibration isolating mounting construction especially useful to support small machines having rotating parts, such as small horsepower motors, in spaced relation with respect to the stationary supporting structure.

It is important that a motor employed in connection with domestic appliances and other apparatus, e.g. for driving fans, be suitably supported so that vibrations and noises produced by the motor during its operation are not transmitted from the motor frame through the supporting structure to components of the apparatus which may be resonant to the exciting frequency of the energized motor. For instance, in the past there has been a practical difficulty encountered in the effective isolation of 120 cycle per second pulsating torques or torsional motor vibrations created in the stator during motor operation by utilizing a mounting arrangement which is economical to manufacture in mass production quantities. It is also desirable that the mounting parts be simple in construction and relatively few in number while at the same time permitting easy and quick installation onto a motor, making further economies possible. Moreover, the mounting arrangement must be capable of satisfactorily supporting the motor for a long period of time without requiring replacement of parts, especially significant where the motor is mounted in relatively inaccessible locations.

Accordingly, it is an object of this invention to provide an improved mounting arrangement for a small motor or other machine which effectively isolates motor vibrations.

It is a further object of this invention to provide an improved motor supporting structure including relatively few simply constructed component parts which are extremely economical to manufacture in mass production quantities and are readily assembled to a motor or the like.

It is yet another object of the present invention to provide an improved low cost mounting arrangement for a motor or the like which utilizes a pair of torsional resilient or spring systems coupled together to isolate and prevent the transmission of torsional motor vibrations, particularly of the troublesome 120 cycle per second type, to a supporting base.

In carrying out the objects in one form thereof, I provide an improved mounting arrangement for supporting an electric motor in spaced relation on a base. In the preferred form, a pair of elongated sheet metal members are each provided with a leg section arranged to be secured to the base at its one end. At the other ends of the leg sections, they are rigidly secured together causing the legs to provide a first resilient system. A pair of arcuate shaped sheet metal clamping elements, integrally joined to and supported from the other end of the respective leg sections, as arranged in engaging relation with the periphery of the motor for clamping around the motor. The portions of the clamping elements disposed adjacent the leg sections are in effect formed as leaf springs whereby the elements coact to produce a second resilient system which cooperates with the first system to limit the transmission of torsional vibrations, especially 120 cycles per second torque pulsations, from the motor to the base in a most effective, yet inexpensive manner.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawings.

In the drawings:

FIG. 1 is a side view showing the preferred embodiment of the improved mounting arrangement supporting a small electric motor in spaced relation on a base;

FIG. 2 is an end view of the arrangeemnt shown in FIG. 1;

FIG. 3 is a bottom view of the arrangement shown in FIG. 2, with the base being removed;

FIG. 4 is an enlarged view of a portion of the mounting structure illustrated in FIG. 2 to show detail;

FIG. 5 is a view in perspective of the cooperating sheet metal components of the mounting structure of FIGS. 1–4 inclusive to reveal detail;

FIG. 6 is a side view illustrating a modification of the invention;

FIG. 7 is an end view of the structure of FIG. 6;

FIG. 8 is a bottom view of the embodiment shown in FIG. 6, partially broken away, to show structural details; and FIG. 9 is a view in perspective of the component parts of the mounting modification.

Referring now to the drawings, for purposes of illustration the embodiments of the invention are shown supporting a fractional horsepower electric motor, generally indicated at 10, in spaced relation above a base plate 11, which may be a component part of the domestic appliance itself, such as a frame for a fan (not illustrated). Motor 10 of the exemplification is of conventional construction, having a stator and a standard rotor carrying shaft 12 with an end 13 projecting axially beyond a generally cylindrical housing 14, end 13 being adapted to mount and drive an impeller or the like (not shown).

In order to isolate and limit the transmission from motor 10 to base 11 of torsional vibrations, especially the heretofore rather troublesome 120 cycle per second pulsating torques created in the motor stator during operation, I provide a resilient mounting arrangement having two coacting resilient or spring systems. With specific reference to FIGS. 1–5 inclusive which illustrate the preferred embodiment of my invention, a pair of identical elongated cooperating members 20 and 21, fabricated from rectangular-shaped stiff resilient material such as commercially available steel stock, together provide both resilient systems.

In the illustrated form, one resilient system includes generally flat leg sections 22 and 23 which are inclined upwardly (as viewed in the drawings) toward each other and are rigidly connected together at their upper ends by a pair of transversely extending brace sections 24 and 25. Each brace section is integrally joined at one end 26 to one leg section and has a projection 27, formed between shoulders 28, on the other end accommodated in a complementary recess or slot 29 provided in the opposite leg section. Thus, the shoulders 28 of bracing section 24 are adapted to engage the side face of section 23 adjacent slot 29 while brace section 25 will similarly engage the opposing leg section 22. If desired, suitable ribs 30 and 30a may be formed longitudinally in each leg section for additional strength. In addition, a hole 31 may be stamped into ribs 30 for carrying motor energizing leads (not shown) without adversely affecting the spring characteristics of the leg sections. The bottom part of each leg section, remote from its associated brace section, may be conveniently bent in an opposite direction to that of the brace section to form a foot 32 for mounting each member in the desired fixed position on base 11. This may be readily accomplished, as shown in FIGS. 1 and 2, by passing bolts 34 through elongated slots 35 in the feet and into spaced apart threaded holes provided in base 11.

The second resilient system formed by members 20 and 21 comprises a pair of cross-over generally arcuate shaped clamping sections or elements 36 and 37, each having a curved clamping portion 38 adapted to engage the peripheral surface of motor housing 14, and a relatively straight portion 39 formed integral with the upper end of its associated leg section to function in effect as a leaf spring. From FIG. 5 it will be seen that the bracing and clamping sections of the individual members 20 and 21 may be conveniently cut in side by side relation from the same rectangular part of the members. To provide additional stiffness, suitable ribs 40 may be stamped into leaf spring portions 38 of the respective clamping sections 36 and 37. For completing the clamping action on motor 10 by the clamping sections, their free ends 41 may be bent upwardly and formed with suitable apertures 42 to receive screw 43 for drawing clamping portion 38 of the elements tightly around and into engagement with the periphery of the motor. If desired, suitable projections (not shown) may be provided in the side surfaces of the clamping sections 36 and 37, intermediate their ends, to cooperate with complementary depressions or slots in the motor housing to assist in properly positioning the motor between clamping sections 36 and 37. Conversely, of course, the projections may equally as well extend outwardly from the periphery of motor housing 14, with the accommodating depressions being included in the engaging clamping portion 38 of elements 36 and 37.

In actual practice members 20 and 21 constructed in accordance with the illustrated form have satisfactorily mounted motors and served to prevent pulsating torques and other motor torsional forces from being transmitted to the base. The mounting arrangement accomplishes this isolation, as far as I can determine, by the two spring systems, which are in essence coupled together and so interrelated that the torsional moments applied to the rigid connection between the leg sections; e.g., brace sections 24 and 25, are opposed by the moments set up by the lateral forces applied at the same point. The moment resulting from the application of the lateral forces takes into consideration the linear distance or moment arm defined between the base and the connection. The magnitude of these torsional moments and lateral forces will be determined by the two spring systems in conjunction with the motor stator inertia, the mass of the motor, and the mass of the leg and brace sections. Consequently, to derive the most beneficial use of my invention, the length of the leg sections and dimensions of the leaf spring portions of the clamping sections, as well as the thickness and stiffness of the material, the principal factors affecting the spring characteristics of the individual resilient systems, may be optimized for any given motor size and load application.

It will be appreciated from the foregoing description that sheet metal members 20 and 21, being preferably identical in form and relatively simple in construction, provide two resilient coacting systems with a maximum of economy. Their fabrication includes low cost stamping and bending operations, with excellent material utilization. Moreover, by virtue of the intimate contact between members 20 and 21 and the outer surface of motor housing 14, as well as the extensive heat radiating surfaces of the members, the mounting of the first embodiment efficiently conducts heat away from the motor during operation and transfers it to the surrounding atmosphere. Further, the supporting arrangement is extremely versatile in nature and may be installed as a unit having the motor shaft disposed in any desired direction; e.g., nonhorizontal, with a minimum expenditure of labor.

FIGS. 6–9 inclusive illustrate a modification of my invention for isolating the torsional vibrations of motor 10 and supporting it in spaced relation on base 11. For convenience of representation, the component parts of the motor are identified by the same numbers as employed in connection with the first embodiment of FIGS. 1–5. The first resilient or spring system of the second embodiment is furnished by a single piece of sheet metal material in which a pair of upwardly inclining leg sections 50 and 51 are integrally joined together in a rigid fashion at their ends remote from base 11 by a transverse connecting bight section 52. Like the first embodiment, the modification of FIGS. 6–9 includes ribs 53 provided longitudinally in each leg section to augment the stiffness of the material. The lower part (as viewed in the drawings) of each leg section also terminates in a foot 54, bent away from the opposite leg section for forming, along with bolts 55, means to fasten the leg sections onto base 11. A pair of identical clamping elements 56 and 57 in the form of sheet metal bands or straps, together with connecting section 52, define the second resilient system of this embodiment.

More specifically, connecting section 52 is preferably constructed in a generally W configuration for strength and resiliency with the center portion 58 thereof being slightly raised. A rectangular slot 59 is provided in portion 58 and includes diametrically opposed slot extensions or notches 60 of diminished cross-section for accommodating and interlocking with bent T-shaped ends 61 of the individual clamping elements 56 and 57. Slot 59 should be of sufficient size to allow easy entry of the T-shaped element ends 61 therein. The ends 62 of elements 56 and 57, remote from connecting section 52, are made upright with apertures 63 in register for receiving screw 64, which secures the elements tightly around motor housing 14. Consequently, when ends 61 of clamping elements 56 and 57 are assembled within notches 60 of connecting section 52 and the elements are pulled taut around motor 10, the motor is held firmly on raised portion 58 of section 52. Portions 65 of clamping elements 56, 57, adjacent element ends 61, tend to react as a leaf spring to produce the second resilient system. For stabilizing and maintaining the motor in an upright position on raised portion 58, it is desirable with this construction to position a resilient rubber cuff, sleeve 66 or the like around leaf spring portions 65 of elements 56, 57. A sleeve 66 will thus be disposed on either side of raised portion 58, between connecting section 52 and the bottom of the motor, and will effectively preclude any relative motion, such as lateral rolling movement, of the motor with respect to connection section 52.

It will be seen from the foregoing description of the embodiment shown by FIGS. 6–9 that it provides two coacting resilient systems for isolating torsional motor vibrations, utilizing relatively simple and inexpensive parts fabricated by low-cost manufacturing procedures. Further, like the first embodiment, the mounting modification is easily assembled to the motor, and the mounting structure along with the motor may readily be installed as a unit in the desired location with the minimum of labor expenditures.

It should be apparent to those skilled in the art, while I have shown and described what at present is considered to be the preferred embodiments of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. A resilient motor mounting for supporting an electric motor in spaced relation on a base, comprising a pair of members formed of sheet material each including an elongated leg section arranged to be secured to said base at one end, an arcuate clamping section secured to the other end of an associated leg section and a bracing section also secured to said other end of said associated leg section and extending transversely to said leg section, each bracing section being arranged to engage the leg section of the other member thereby to secure said members together, said clamping sections crossing one another adjacent said other ends of the leg sections and being disposed in an oppositely facing relationship when said members are secured together for clamping said motor therebetween, and each of said clamping sections having a portion adjacent its associated leg section formed as a leaf spring, whereby said clamping sections act as a resilient system when clamped around said motor.

2. A resilient motor mounting for supporting an electric motor in spaced relation on a base, comprising a pair of sheet metal members each including an elongated leg section arranged to be secured to said base at one end, an arcuate clamping section secured to the other end of an associated leg section and a bracing section also secured to said other end of said associated leg section and extending transversely to said leg section, each of said leg sections being formed with a slot adjacent said other end thereof, each bracing section having a projection accommodated in the slot of the leg section of the other member and including a shoulder arranged to engage the leg section of the other member adjacent the slot thereby to secure said members together, said arcuate clamping sections being disposed in an oppositely facing relationship when said members are secured together for clamping said motor therebetween, and each of said clamping sections having a portion adjacent its associated leg section formed as a leaf spring, whereby said clamping sections act as a resilient system when clamped around said motor.

3. A resilient motor mounting for supporting an electric motor in spaced relation on a base, comprising a pair of inclined elongated sheet metal legs arranged to be secured to said base at their one ends, connecting means including a transverse section integrally joined to said legs at their other ends for fixedly attaching said legs together and causing said legs to form a first resilient system, and a pair of arcuate sheet metal clamping elements supported from said connecting means and arranged for clamping around said motor to mount said motor, one end of each clamping element detachably received in an aperture in said connecting means in spaced relation to said legs with the free end thereof arranged for connection to the free end of the other element, said one end being undetachable from said aperture when said free ends are connected, the portions of said clamping elements adjacent said transverse section being formed as leaf springs, whereby said clamping elements act as a second resilient system cooperating with said first system to limit the transmission of torsional vibrations from said motor to said base.

4. A resilient motor mounting for supporting an electric motor in spaced relation on a base, comprising a supporting section formed of sheet metal and acting as a first resilient system, said supporting section including a pair of inclined legs arranged to be secured to said base at one end and a transverse section connecting said legs together at their other ends, and a pair of arcuate clamping elements mounted on said transverse section and arranged for clamping around said motor to mount said motor, said clamping elements including an end portion detachably received in an aperture in said transverse section and a free end arranged for connection to a free end of the other element, the connection of said free ends maintaining the attachment of said one end in said aperture, and leaf spring portions formed therein adjacent said transverse section, said leaf spring portion of the clamping elements acting as a second resilient system for cooperating with said first system to limit the transmission of torsional vibration from said motor to said base.

5. A resilient motor mounting for supporting an electric motor in spaced relation on a base, comprising a supporting section formed of sheet metal and acting as a first resilient system, said supporting section including a pair of inclined legs each arranged to be secured at one end to the base and a transverse section connecting said legs together at their other ends, said transverse section having a centrally disposed raised portion, said raised portion including at least one slot, a pair of arcuate clamping elements each having an end adapted to be received in said slot and mounted on said transverse section and having the other end arranged for clamping around said motor, said clamping elements including leaf spring portions formed therein adjacent the raised portion of said transverse section for producing a second resilient system cooperating with said first system to limit the transmission of torsional vibrations from the motor to the base, and resilient means carried by each clamping element adjacent said raised portion and in engagement with said transverse section at said leaf spring portions for insuring that said clamping elements and motor are maintained in an upright stationary position on said supporting section.

6. A resilient motor mounting arrangement for supporting an electric motor in spaced relation on a base, comprising a pair of elongated legs formed of sheet material arranged to be secured to the base at their one ends, connecting means rigidly securing said legs together at their other ends and causing said legs to form a first resilient system, and a pair of arcuate clamping elements formed of sheet material each having one end supported from said legs and having a free end, means securing the free end of said clamping elements together for drawing said clamping elements tightly around the motor, said first resilient system having an aperture therein, a member having a first portion received in said aperture and a second portion for engaging a wall of said first resilient system adjacent said aperture to maintain said first resilient system and said clamping elements in a predetermined relationship, said latter means urging said second portion of said member into firm engagement with said wall for rigidly securing said first resilient system and said clamping elements in the predetermined relationship, portions of said clamping elements adjacent said legs being formed as leaf springs, whereby said clamping elements act as a second resilient system cooperating with the first system to limit the transmission of torsional vibrations from the motor to the base when said clamping elements are clamped around the motor.

References Cited in the file of this patent
UNITED STATES PATENTS

| | | |
|---|---|---|
| 1,085,421 | Hiller | Jan. 27, 1914 |
| 1,125,064 | Connell | Jan. 19, 1915 |
| 2,365,985 | West | Dec. 26, 1944 |
| 2,661,172 | Needham | Dec. 1, 1953 |
| 2,745,653 | Deason | May 15, 1956 |